United States Patent [19]

Guong-Hong

[11] Patent Number: 5,004,446
[45] Date of Patent: Apr. 2, 1991

[54] DEVICE AND METHOD FOR COLLECTING BEE VENOM BY ATTRACTING AND ELECTROCUTING INJURIOUS BEES

[76] Inventor: Li Guong-Hong, Highway Transportation Administration Station, Xinyang City, China

[21] Appl. No.: 294,346
[22] Filed: Jan. 6, 1989

[30] Foreign Application Priority Data

Feb. 14, 1988 [CN] China .................. 88100579

[51] Int. Cl.$^5$ .............................................. A01K 57/00
[52] U.S. Cl. .......................................... 449/1; 449/47; 43/112; 43/139
[58] Field of Search ............ 449/1, 2, 7, 27, 47; 43/112, 139, 140

[56] References Cited

U.S. PATENT DOCUMENTS

| 738,184 | 9/1903 | Goodwin | 43/139 |
|---|---|---|---|
| 2,780,026 | 2/1957 | Dail et al. | 43/139 |
| 2,893,161 | 7/1959 | Reid | 43/139 |
| 3,319,374 | 5/1967 | Gawne | 43/112 |
| 4,739,531 | 4/1988 | Robson | 449/47 |

FOREIGN PATENT DOCUMENTS 663355 5/1979 U.S.S.R. .................. 449/47

Primary Examiner—Robert P. Swiatek
Attorney, Agent, or Firm—Martin Smolowitz

[57] ABSTRACT

Substances are blown out along the natural wind toward the injurious bees, or group of other insects, for attracting them to an electric grid where a low voltage causes them to deposit venom on the bare wires of the grid and collected on receiving plates. Then the voltage is increased electrocuting them. The venom is removed from the receiving plates and the dead bodies of the bees or other insects are removed from a collecting bag. The device can guarantee the safety of the operating personnel and consists of two parts: an operating compartment and a collection unit. The device can be moved by its own or external effort in order to safely pursue and be close to the injurious bee colony and to operate continuously for a long period. With this device, the propagation or spread of the injurious bees can be controlled and venom be collected safely.

13 Claims, 4 Drawing Sheets

DEVICE AND METHOD FOR COLLECTING BEE VENOM BY ATTRACTING AND ELECTROCUTING INJURIOUS BEES

The present invention relates to a device and method for collecting bee venom by attracting and electrocuting injurious wild bees and collecting the bodies of the dead bees. The invention is especially suitable for collecting the venom from injurious bee colonies, killing them, and collecting their bodies. It is also suitable for collecting venom, attracting and electrocuting bees and collecting the bodies of bees from domestic bee colonies which have lost their Queen bee and/or from those bee colonies which are ready to be abandoned.

BACKGROUND OF THE INVENTION

Since the East-African bee varieties, introduced from Africa for genetic experiments, flew away and escaped, they continuously hybridize with the local bee varieties under local ecological conditions and breed rapidly. These bees live in the wild state and have an extremely fierce temper. At present the total number of bee colonies is greater than 10 million. They propagate outward at a speed of 100-200 miles per year, and have invaded Brazil, Argentina, French Guyana, Venezuela, and peru and spread northerly via Central America. According to the estimate by specialists, they will arrive in Texas in the USA in the near future.

The characteristics of these bees are high sensitivity, amazing speed of reproduction, very strong ability to attack and pursue, habit of mobilization in a crowd to attack people and livestock, and great injuriousness. Hence they did serious damage to the life of the local people. In South America a lot of people and animals have been hurt or killed by these bees. They are called "slayer-bees" or "killer-bees" because of their fierce character. Experts predict that, after the arrival of the killer-bees in the U.S., it will be very difficult to control them. They not only would hurt people and animals, but also would seriously imperil the American bee-raising industry. Hence the production of about 100 kinds of agricultural plants, dependent on pollen-transfer by bees would be reduced, which would result in uncountable losses.

For thirty years people have attempted to take a series of measures or methods to prevent the propagation of the killer-bees. The first measure is a hybridizing method used to improve their character. European bees are continuously introduced on a large scale for replacement or hybridization in an attempt to change the fierce and bellicose nature of the killer-bees. However, practice has proved that the descendents of the killer-bees hYbridized with the European bees are as fierce as the killer-bees. So the idea of using this method to correct the extreme bellicosity of the killer-bees has not resulted in the desired effect.

The second method is the creation of isolation zones. This project involves inspection of the ships and vehicles coming into the isolation zone to determine whether they carry killer-bees or not; award of high prizes offering a great deal of money to those who have discovered a colony of the killer-bees; and lure of the male bees to be killed by means of the external sexual hormone from the female bees. However, this project is difficult to carry out due to the high cost.

The third method is poison spray, and helicopters have been used to spray poison to eliminate the killer-bees. But because of the geographical environment and the particularity of the place where the bees live, little effect has been attained and the local ecological balance may be destroyed. It is impossible to collect venom from the bees by the known technique, because the known technique of collecting venom is only adequate for domestically raised bees. Since the killer-bees have an extremely fierce temper, conventional protective measures are not sufficient to guarantee continuous operation and the personal safety of the operators. Moreover in this case, no air blow for emission of the luring or stimulating substances is applied.

The above-mentioned situation has caused public concern about how to effectively control the spread and propagation of the killer-bees or to eliminate them on a large scale without deterioration of the local ecological environment.

The object of the present invention is to provide a device to lure this kind of injurious bees to death on a large scale so as to effectively control their development and propagation and at the same time to collect bees bodies and a large amount of expensive bee venom in the solid state while guaranteeing the personal safety of the operators. The present device can be used to lure other injurious insects to death and to collect their bodies as well.

SUMMARY OF THE INVENTION

This invention provides a device and method for safely collecting bee venom, attracting insects to death and collecting the bodies of the dead insects. In other words, the invention provides a method and device for collecting bee venom by attracting and electrocuting the injurious bees. The device consists of a safe operating compartment and connected therewith a unit for collecting bee venom by attracting and electrocuting the bees. The whole device can be mounted on a motor vehicle or pulled by another motor vehicle or suspended from an air-borne apparatus. There are hooks mounted firmly on the device for hauling or hoisting. Both ends of the operating compartment are provided with well-ventilated dense meshes, through which no injurious bees or other insects are admitted (e.g., a dense mesh made from metal or other material). in the operating compartment there are a ventilator and an air blower together with an air blow pipe, connected with the aIr blower and leading onto the bare wires of the electric grid of the collection unit. In the collection unit an apparatus for collecting venom is mounted, in which there are two or more receiving plates, which can be operated in turn. These plates can be drawn back into the operating compartment, or pushed out into the apparatus for collecting venom in the collection unit. Over the venom receiving plates there is an electric grid made of hare metal wires, the orientation of their arrangement is in alignment with the direction of the air flow which comes out from the air blow pipe. At the terminals of the venom receiving plates, there is a string bag for collecting the killed bees or insects. The string collecting bag is mounted in the treating chamber with its entry toward the exit of a one-way valve on the treating chamber, the housing of which is bottomless and is made from thin sheet steel or other materials with an open mouth downward. One end of the collection unit is connected with the operating compartment, so that air can pass freely through this junction; the top, bottom, and sides of the unit are closed completely. At the other end, far from the operating compartment, there is an end wall made from the above-mentioned dense mesh, on which there is a controllable mesh gate with a controllable opening, to adjust the number of bees entering said unit when said gate is moved or opened.

The warning message substances of injurious bees or the luring substances of the other insects (for example, carnivorous ants) are sprinkled on the bare wire of the electric grid. The air flow passing through the air blow pipe from the blower reaches the electric grid, circulates in the treating chamber, and exits via the controllable mesh gate in the mesh wall at the back end of the unit blowing out into the natural wind toward the injurious bee colony or other insect group. At the same time, there are warning message substances of the injurious bees or luring substances of other insects in the air flow so as to stimulate or attract injurious bees or other insects. Due to the nature of the bees, i.e. flying against the wind under the stimulation of the warning message substances of the injurious bees, they rush against the wind into the collection unit. The same method may be used to attract other insects. As soon as they contact the wire of the electric grid above the venom receiving plate and under a low voltage, they are stimulated to discharge their venom onto the receiving plate, then a high voltage is applied to the electric grid to kill them. They are swept by the air flow from the blow pipe into the string collecting hag through the valve located at the entry of the string bag. The air flow, circulating in the treating chamber and coming out of it through the small passage downward, carries away the warning message substances of the injurious bees or the luring substances of the other insects and blows out towards the group of injurious bees or other insects in the direction of the wind through the controllable mesh gate and the wall at the hack end of the collection unit to stimulate and attract more injurious bees or other insects to this unit. The opening of the controllable mesh gate can he regulated to control the number of injurious bees or other insects entering the collection unit. The operations are concentrated in the operating compartment, which is tightly closed at the top, at the bottom, and at both side walls and is fitted at both ends with dense meshes preventing the entrance of the injurious bees or other insects, but allowing air to pass through. The operating compartment, in which the receiving plate can be drawn back and forth continuously for automatic operation, is absolutely safe, as it has good ventilation and is free from any injurious bees or other insects. In the operating compartment, the ventilator enforces the air moving toward the collection unit. It not only cleans the air from evaporated harmful substances of the bees, but also amplifies the air flow produced by the blower toward the controllable mesh gate.

Further, a similar device and method according to this invention can also be applied to electrocuting and collecting carnivorous ants.

In comparison with the prior art, the present invention has the following advantages or active effects:

1. The device has a safe operating compartment, so that the operator can carry out the operations of collecting venom, killing the injurious bees, etc. therein, instead of working outside. In addItIon, owing to the special method of location or method of moving the device provided by the present invention, so that the controllable mesh gate may face the injurious bees or other insects, or the method of turning the device in the direction of the natural wind to face the injurious bees or other insects, and owing to the ventilator mounted in the operating compartment, the air which may carry harmful substances in the operating compartment flows with the natural wind out of said compartment. In thIs way, the operator can be protected from harm, caused by the injurious bees, other insects and harmful substances.

2. The device is characterized in that it can be maneuvered automatically or by external efforts, so that the operator can safely pursue and be close to the zone crowded by the injurious bees.

3. The device has at least two venom receiving plates for alternate operation to permit high efficiency of venom collecting and continuous operation.

4. The device has a rain shelter so that the electric circuit can be protected from erosion caused by the rain, resulting in a breakdown of the circuit, and the shelter can prevent the venom collected on the receiving plates from being dissolved and polluted by the rain.

5. The design of the treating chamber, as shown in FIG. 2, allows the warning message substances, generated by the bodies of the injurious bees, to return together with the air flow into the venom collection unit, so as to increase the effect of stimulating or attracting the injurious bees.

BRIEF DESCRIPTION OF THE DRAWINGS

The device and its method of use according to this invention will now be illustrated by the accompanying drawings in which.

DETAILED DESCRIPTION

Figure 1:
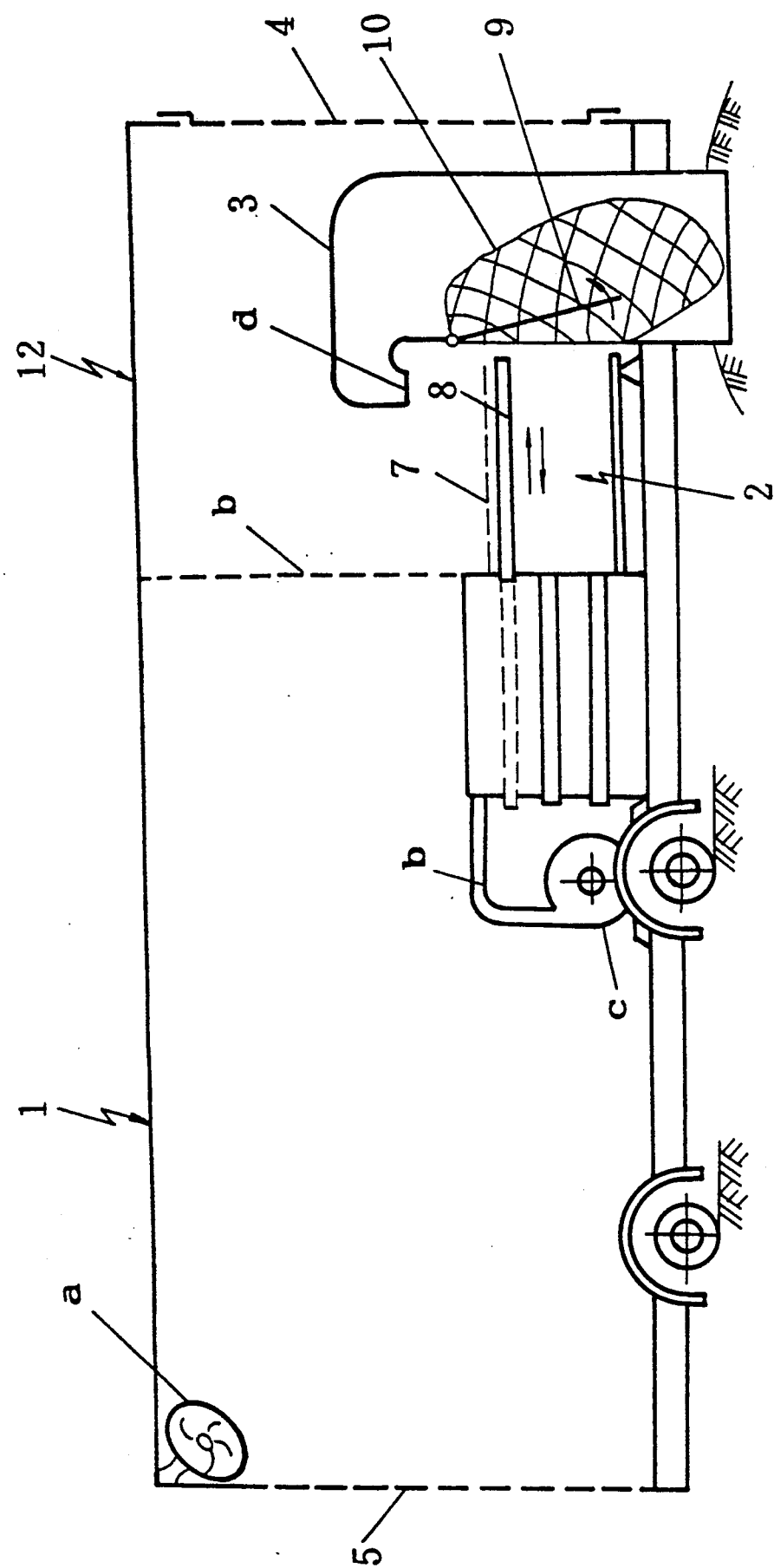
FIG. 1 is a schematic elevation view of the structure of the device for safely collecting bee venom and electrocuting bees.

As shown in FIG. 1, the device for collecting bee venom and electrocuting the injurious bees consists of an operating compartment 1 with motive power (e.g. mounted on a motor vehicle or pulled by another motor vehicle or suspended from an air-borne apparatus) and a unit 2 for collecting venom by attracting and electrocuting bees and connected to the operating compartment, and allowing the air to pass through between them. The operating compartment has a capacity of 1-2 persons working in it, and contains the ventilator a, the air blower c and the air blow pipe b, connected with the air blower c, and directed to the electric grid 7 in the collection unit. The air flow coming out from the air blow pipe may sweep away the killed injurious bees or insects into the treating chamber 3 (ref. to FIG. 2). The metal wires of the electric grid 7 are arranged in the direction of the air flow, exhausted from the air blow pipe b (see FIG. 2, FIG. 3). At both ends of the operating compartment there are dense meshes 5, 6 preventing the entrance of the injurious bees or other insects, but allowing the air to pass through. Under the electric grid 7 of the collection unit, there are at least two bee venom receiving plates 8, which can enter the collection unit to receive the bee venom, and can be drawn back to the operating compartment to collect the bee venom thereon.

One end of the collection unit 2 made of dense mesh is connected with the operating compartment, allowing air to pass through between them and preventing the entrance of injurious bees or other insects; the wall of the other end is made of dense mesh allowing the air to pass through and preventing the entrance of injurious bees or other insects and is provided with a controllable mesh gate 4 of the "push-pull" or other type. The opening of the controllable mesh gate, which is a screen window, can be regulated to control the number of injurious bees or other insects entering the collection unit. At the junction of the collection unit and the operating compartment, there is an apparatus for collecting venom consisting of several (two or more) receiving plates 8 and the bare wires of the electric grid 7 which are arranged in the direction of the air flow exhausted by the air blow pipe b. The receiving plates 8 can be drawn back to the operating compartment 1 for collecting the bee venom deposited on these plates. The other end of the collection unit (i.e., at the end of the receiving plates 8, facing the controllable mesh gate 4), is provided with a bottomless treating chamber 3, on the side wall of which there is a one-way valve 9. Along the entrance of the one-way valve 9 there is mounted a string collecting bag 10 within the treating chamber. The treating chamber 3 is set with its opening of the one-way valve 9 and opening of the string collecting bag 10 toward the end of the collection unit 2 (i.e. electric grid 7 and receiving plate 8). The treating chamber 3 with another downward opening d is closed elsewhere and can be set tightly on the ground to ensure the tightness of all its parts except the one-way valve and the downward opening. At the end wall of the back end of the collection unit (the end far from the operating compartment) there is a controllable mesh gate 4 of the push-pull type or other type. This wall is made of dense mesh, allowing the air to pass through but preventing the entrance of injurious bees or other insects. The top, the bottom and sides of this unit are closed tightly, and the air flow, passing from the operating compartment, can blow out only through the controllable mesh gate and the wall at the back end, which is made of dense mesh.

The above described device is able to be moved automatically or by external efforts so as to pursue and be close to the injurious bees or other insects.

The method for collecting venom by attracting and electrocuting the injurious bees or other insects, provided by this invention, is as follows (see FIG. 2):

Some substances attracting and/or stimulating the bee colony or other insects, such as warning message substances, tracing external hormone, warning external hormone, etc., are sprinkled on the venom collection unit 2, especially on the wires of electric grid 7 to lure and enrage them to attack the venom collection unit 2, especiallY on the wires of electric grid 7. When several injurious bees or other insects fall down on the wires of electric grid 7, a weak electric current of low voltage is switched on in time to stimulate them to sting and discharge the venom onto the receiving plate 8. Meanwhile they release warning message substances which will then attract more injurious bees or other insects to attack the wires of electric grid 7. As soon as a certain number of injurious bees have stung the electric grid 7, the operator raises the voltage of the electric grid 7 at once to kill them, then cuts off the current and starts the air blower c to sweep the dead bee bodies into the string bag 10 of the treating chamber 3. When the air blower is turned off, the one-way valve 9 of the treating chamber 3 can return to its original position automatically to close the entry (the opening of the one-way valve) of the string bag 10 of the treating chamber, so as to prevent unkilled bees from escaping. The treating chamber 3 is bottomless and covers the ground tightly as a cap during the work. The air flow generated by the air blower c passes from the outlet of the blow pipe b into the one-way valve 9, then comes out of the downward opening d. And the treating chamber 3 can be turned over by the operator after finishing the work in order to take out the string bag 10 with the dead bees. Under the electric grid 7 the receiving plate 8 can be drawn back by the operator to the operating compartment 1 for scraping and collecting the bee venom thereon. Then a new receiving plate is pushed into the apparatus 2 for collecting venom again. A low voltage is applied to the wires of electric grid 7, and the above mentioned operations of collecting bee venom, electrocuting, blowing, sweeping, and scraping the venom are repeated cyclicly. The complete process can be carried out automatically and continuously.

Figure 2:
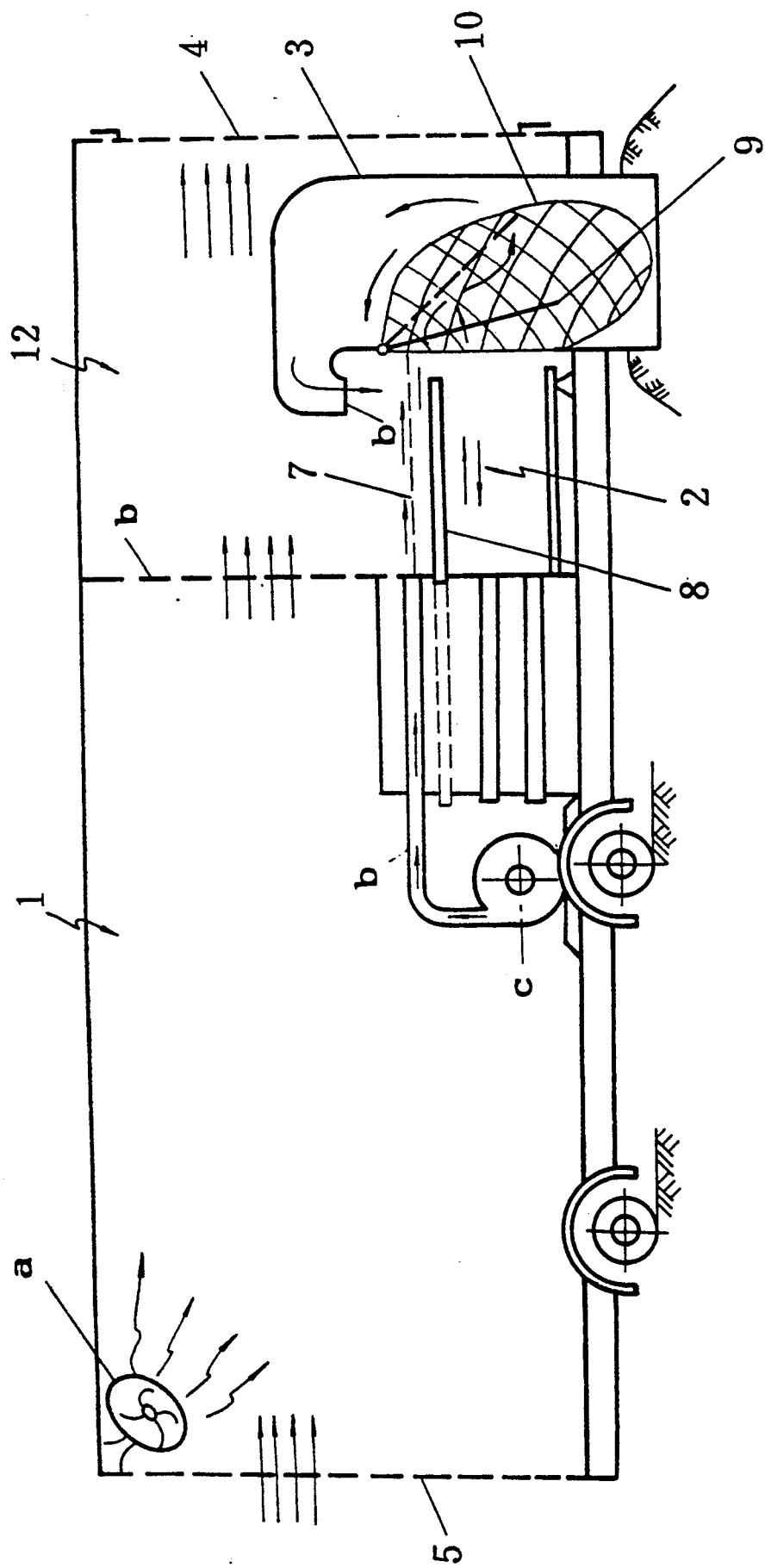
FIG. 2 shows the principles of operation of the device for safely collecting bee venom and electrocuting the bees, showing the way in which the air flow passes through the device.
Figure 3:
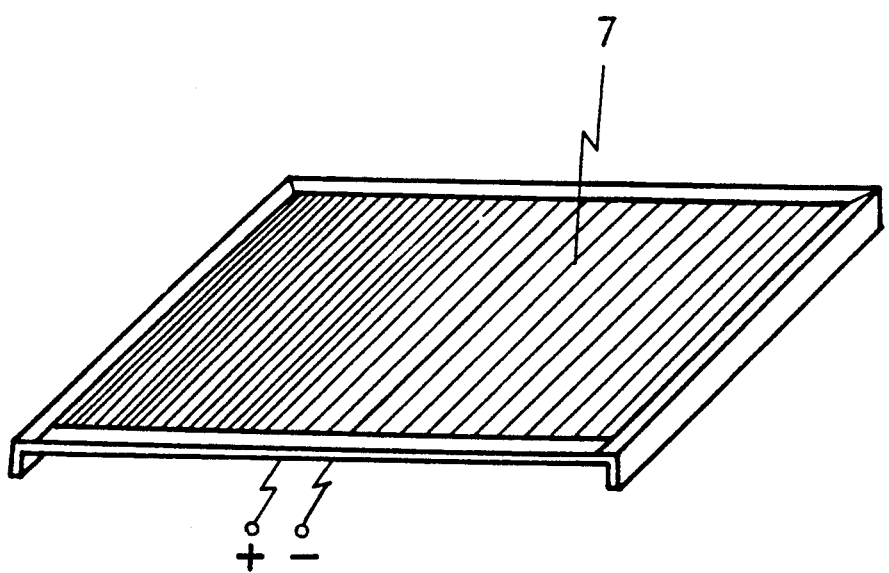
FIG. 3 is an enlarged schematic drawing of the electric grid on the venom receiving plates in the device for safely collecting bee venom and electrocuting the bees.
Figure 4:
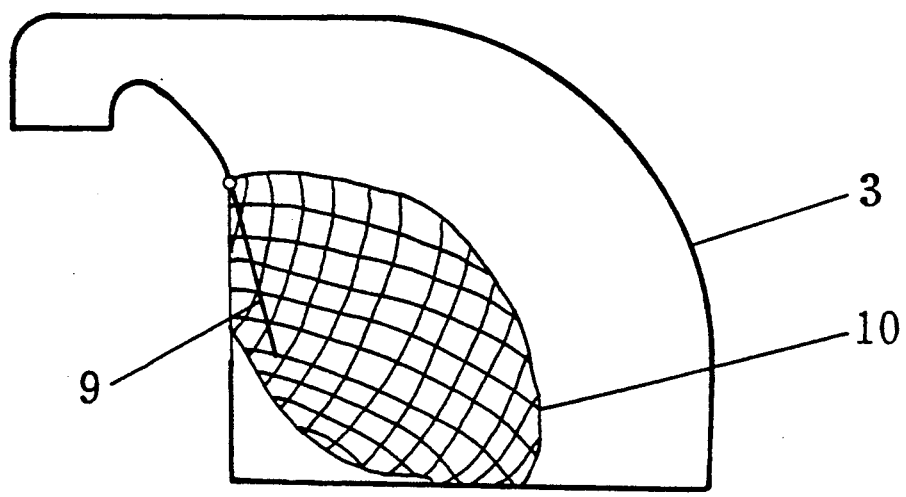
FIG. 4 is a schematic construction drawing of the treating chamber in the device for safely collecting bee venom and electrocuting the bees.

FIG. 2 shows the method of orientation of the device according to the location of the injurious bee colony, the direction of the natural wind (shown by the parallel arrows in FIG. 2) and the level of the wind strength as follows: turn the controllable mesh gate 4 toward the bee colony or the group of other insects, i.e. move the collection unit 2 toward and close to the bee colony, so as to keep the direction of air flow from the air blow pipe b and the ventilator a in alignment with the direction of the natural wind and to have the controllable mesh gate 4 face the injurious bee colony or the group of other insects. If no natural wind is available, the controllable mesh gate 4 is turned toward the injurious bee colony or the group of other insects. The air blower c and/or the ventilator a is started to blow out the air flow carrying the luring or stimulating substances against the groups of injurious bees or other insects, to lure or stimulate injurious bees or other insects into the collection unit by attracting and electrocuting them.

EXAMPLES

1. As shown in FIG. 2, some substances for luring carnivorous ants are sprinkled on the wires of the electric grid 7, then the controllable mesh gate 4 is turned toward the group of carnivorous ants. After starting the ventilator a, the air flow carrying luring substances is blown toward the carnivorous ants (it is preferable to align the blow pipe along the direction of the natural wind if natural wind is available). The carnivorous ants will be attracted to contact the electric grid 7 of the collection unit voluntarily. Then the voltage of the electric grid 7 is raised to kill the carnivorous ants on it. Further, the dead ant bodies will he swept away into the string collecting bag 10 by air flow, blown out from the air blow pipe b.

2. As shown in FIG. 2, some warning message substances of the injurious bees are sprinkled on the wires of the electric grid 7, then the controllable mesh gate 4 is turned toward the injurious bee colony. After starting the ventilator a the air flow with the warning message substances is blown out of the controllable mesh gate 4 and the wall thereof, made of dense mesh at the end of the collection unit. If natural wind is available, the air flow will blow out along the natural wind toward the injurious bee colony. Under the stimulation of the warning message substances and according to the habit of flying against the wind, the injurious bees rush onto the electric grid 7 in the collection unit. As they are stimulated by the low voltage on the electric grid 7, they discharge venom and release warning message substances. The injurious bees are then killed by raising the voltage of the electric grid 7, and the bodies of the dead bees are blown away into the string collecting bag 10. After that, the receiving plate 8 is drawn back into the operating compartment 1 to scrape off the venom thereon and another receiving plate 8 is pushed into the collection unit. At the same time the ventilator a is started to keep the air moving and clean in the operating compartment.

Although this invention has been described broadly and in terms of specific examples, it will be apparent that modifications and variations can be made as defined by the following claims.

I claim:

1. A device for attracting insects, collecting insect residue and electrocuting the insects, the device comprising:
    (a) an operating chamber (1) having at least one outer wall (5) formed of a porous mesh capable of preventing entrance of insects;
    (b) a collection unit (2) connected to said operating chamber and having a porous mesh wall (6) provided therebetween which is capable of preventing entrance of insects, said collection unit having a porous outer wall (4) adapted for periodic entrance of insects;
    (c) electric grid means (7) located in said collection unit and capable of electrocuting insects contacting the grid;
    (d) at least one receiving plate (8) located below said electric grid and adapted to be moved periodically between the collection unit and the operating chamber;
    (e) a treating container (3) located at least partially within said collection unit for receiving the insects; and
    (f) blower means located within said operating chamber (1) and adapted for directing air past said electric grid means, whereby insects can enter the collection unit and contact at least one receiving plate before being electrocuted on the electric grid and being air blown into the treating chamber.

2. An insect handling device according to claim 1, wherein said collection unit (2) includes in its outer porous wall entrance a controllable mesh gate adapted for periodically admitting insects into the collection unit.

3. An insect handling device according to claim 1, wherein said treating container 93) includes a one-way valve (9) and a porous collecting bag (10) for collecting dead insects.

4. An insect handling device according to claim 1, including fan means provided in said operating compartment for discharging air and dispensing a warning message to distant insects to agitate and induce then to enter the collection unit.

5. An insect handling device according to claim 1, wherein said operating chamber and collection unit are provided with wheels to provide for movement of the device.

6. An insect handling device according to claim 1, wherein said treating chamber (3) has a lower open end which is closable by placing it in contact with the earth.

7. An insect handling device according to claim 1, including means for automatic intermittent opening of said porous outer wall (4) for entrance of insects into the collection unit (2), and means for intermittent movement of two receiving plates between the collection unit and the operating chamber.

8. A device for attracting insects, collecting insect residue and electrocuting insects, the device comprising:
    (a) an operating chamber (1) having at least one outer wall (5) formed of a porous mesh capable of preventing entrance of insects;
    (b) a collection unit (2) connected to said operating chamber and having a porous mesh wall (6) provided therebetween which is capable of preventing entrance of insects, said collection unit having a porous outer wall (4) adapted for providing periodic entrance of insects;
    (c) electric grid means (7) located in said collection unit and capable of electrocuting insects contacting the grid;
    (d) a plurality of receiving plates (8) located below said electric grid and adapted to be moved periodically between the collection unit and the operating chamber;
    (e) a treating container (3) located at least partially within said collection unit and containing a one-way valve and a porous collecting bag for receiving the insects; and
    (f) blower means located within said operating chamber (1) and adapted for directing air past said electric grid means, whereby insects can enter the collection unit and contact the receiving plates before being electrocuted on the electric grid and being air blown into the treating chamber.

9. A method for attracting insects and collecting insect residue, then electrocuting insects, which method comprises:
    (a) placing a substance for attracting insects on a collection apparatus, including an electric grid (7) and a residue receiving plate (8);
    (b) passing a low voltage electric current through said electric grid to stimulate insects to deposit a residue on the receiving plate;
    (c) then passing a high voltage electric current through the electric grid to electrocute the insects thereon;
    (d) blowing the dead insects from the grid into a treating container (3); and
    (e) removing insect residue from the receiving plate.

10. An insect collecting method according to claim 9, including blowing air over the insect attracting substance and electric grid toward a source of insects to attract the insects.

11. An insect collecting method according to claim 9, including drawing the receiving plate containing insect residue from a collection unit into an adjacent operating compartment for removing the residue, then moving the receiving plate back into the collection unit for continued exposure to the insects.

12. An insect collecting method according to claim 9, wherein the insects are bees which deposit venom on the plate, and the collection device is oriented upwind from a source of the bees.

13. A method for attracting bees and collecting bee venom, then electrocuting the bees, which method comprises:

(a) placing substances for attracting bees on a collection apparatus including an electric grid (7) and a receiving plate (8) contained in a collection unit;

(b) orienting the collection unit toward a bee source and blowing air across the attracting substance toward the bee source;

(c) passing a low voltage electric current through said electric grid to stimulate the bees to deposit venom on said receiving plate;

(d) passing a higher voltage electric current through the electric grid to electrocute the bees thereon;

(e) blowing the dead bees into a treating container (3); and (f) removing the receiving plate from the collection unit and removing bee venom from the receiving plate, then returning the receiving plate to the collection unit.

* * * * *

UNITED STATES PATENT AND TRADEMARK OFFICE
CERTIFICATE OF CORRECTION

PATENT NO. : 5,004,446
DATED : Apr. 2, 1991
INVENTOR(S) : Guong-Hong, Li

It is certified that error appears in the above-identified patent and that said Letters Patent is hereby corrected as shown below:

On the title page: Item (19) "Guong-Hong" should read --Guang-Hong--; in item [76], after "Inventor" "Li Guong-Hong" should read --Li Guang-Hong--

Signed and Sealed this

Twenty-eighth Day of April, 1992

Attest:

HARRY F. MANBECK, JR.

*Attesting Officer*   *Commissioner of Patents and Trademarks*